United States Patent Office 3,330,876
Patented July 11, 1967

3,330,876
PROCESS FOR HYDROFLUORINATING
ACETYLENIC HYDROCARBONS
Roland Petit, Paris, Claude Kaziz, La Courneuve, and Georges Wetroff, Le Thillay, France, assignors to Produits Chimiques Pechiney-Saint-Gobain, Neuilly-sur-Seine, France
No Drawing. Filed Mar. 6, 1963, Ser. No. 263,130
Claims priority, application France, Mar. 9, 1962, 890,499/62
The portion of the term of the patent subsequent to June 1, 1982, has been disclaimed and dedicated to the Public
5 Claims. (Cl. 260—653.4)

This invention relates to improved catalytic agents and is in particular directed to improved catalytic agents for use in the hydrofluorinating of acetylenic hydrocarbons.

It is well-known that catalytic agents consisting essentially of mercury salts and disposed on charcoal, graphite or fluorine containing hydrocarbon polymers, can be used for hydrofluorinating of hydrocarbons such as acetylene. These catalytic agents which usually include mercuric nitrate and acetate have been preconized for the hydrofluorinating of acetylenic hydrocarbons in vapor phase to obtain vinyl fluoride difluoroethane 1,1 and fluoroprene. It has been shown, however, that the catalysts previously employed are characterized by severe drawbacks since they quickly lose their activity and tend to agglomerate due to the formation of large amounts of tar. The useful life of the catalytic agents has thus been found to be extremely short from the standpoint of industrial efficiency.

In accordance with the instant invention, catalytic agents for the hydrofluorinating of acetylenic hydrocarbons having considerably improved properties are provided. These catalytic agents, which include mercury derivatives, are characterized by the ability to avoid loss in mercury compounds as well as the ability to avoid formation of tar and accordingly, the useful life of the catalytic agents is relatively great.

The catalytic agents of this invention in addition to including a mercury derivative, for example a mercury salt such as mercuric nitrate, also include an inert porous carrier composed of sintered alumina. The proportions of these elements are maintained within a range of from 1 to 40 percent by weight of said derivative and from 60 to 99 percent by weight of the alumina. Preferable proportions include from 5 to 20 percent by weight of the mercury derivative and from 80 to 95 percent by weight of alumina.

In the preparation of the catalytic agents, the mercury derivatives are contacted with porous sintered alumina having certain essential characteristics. The alumina which is preferred in accordance with the concepts of this invention is characterized by a total porous volume of between 5 and 50 cubic centimeters per 100 grams of alumina. In addition, a specific surface area between 0.01 and 1.0 square meters per gram characterizes the alumina employed. The alumina may be formed in various shapes including granules, fragments, balls, pellets, etc.

The methods of preparing the catalytic agents may vary, however, a suitable method comprises the steps of impregnating the sintered alumina with a solution of a mercury derivative and then drying the impregnated product.

In the process of hydrofluorinating acetylenic hydrocarbons, such as acetylene, a gaseous mixture of hydrofluoric acid and the acetylenic hydrocarbons is first obtained. A bed of porous sintered alumina and associated mercury derivatives is provided and the gaseous mixture is contacted with this catalytic agent.

In accordance with one specific embodiment of this invention, a gaseous current of anhydrous hydrogen fluoride which is diluted by a gas such as nitrogen is passed through a bed of the catalyst prior to contact with the gaseous mixture of acetylenic hydrocarbons and hydrofluoric acid. The gas which dilutes the hydrogen fluoride may be any gas which will not react with the hydrofluoride or with the components in the catalytic agent. This gaseous current is passed through a bed of the catalytic agents at temperatures between 20 and 100° C. Following this operation, the gaseous mixture of hydrofluoric acid and acetylenic hydrocarbon is passed through the catalyst at a temperature between 25 and 150° C. and preferably between 40 and 100° C. This gaseous mixture is preferably made up of between 0.8 and 2 mols, preferably between 1 and 1.2 mols, of hydrofluoric acid per mol of acetylenic hydrocarbon. The pressure maintained during the reaction is not a critical factor and may be anywhere between 0.2 and 10 atmospheres depending on the nature of acetylenic hydrocarbon employed. In the case of acetylene, a pressure of about one atmosphere is suitable.

It has been found to be advantageous to add to the acetylenic hydrocarbon or to the aforementioned gaseous mixture, an amount of at least one gaseous oxygenated derivative of nitrogen. Derivatives of this nature are added in amounts up to 5 percent in volume and preferably between 0.5 and 2.0 volume percent.

Through the use of the catalytic agents of this invention, the described process for hydrofluorinating acetylenic hydrocarbons has been found to be highly economical. The exothermic reaction which takes place during the hydrofluorinating provides for maintenance of the desired temperature in the catalytic mass. The catalytic beds made up of agents of the type described herein have the ability of extending the reaction zone to a major portion of the beds. The use of such beds also favors the production of high yields which contain highly consistent percentages of fluorinated olefins.

The following examples are given by way of illustration, but not by way of limitation of this invention.

*Example 1*

150 g. of mercuric nitrate are dissolved in 500 cm.$^3$ of water acidified with 20 cm.$^3$ of concentrated nitric acid. This solution is used to impregnate 800 cm.$^3$ (1330 g.) of balls of sintered alumina of 2–5 mm. diameter the main characteristics of which are the following:

Total porous volume: 17 cm.$^3$/100 g. of alumina.
Specific surface area: 0.1 m.$^2$/g.

The impregnated mass is then dried at a temperature of 100 to 110° C. during 36 h., then loaded onto a tubular reactor of 3 cm. diameter and 140 cm. long made of stainless steel and treated by a current of gaseous mixture made up of hydrogen fluoride and nitrogen in equimolecular proportions, at the rate of 1 mol per hour of said mixture at a temperature of about 50° C. during five hours.

A mixture of hydrogen fluoride and acetylene is passed through a bed of catalyst thus treated. The gases evolved from the reactor are washed in order to eliminate unreacted hydrofluoric acid, then dried and condensed in a trap cooled by a mixture of acetone and dry-ice. The chromatographic analysis of the condensate determines its composition. The following table summarizes the results of a serial of tests carried out with the same catalyst treated as described herein above.

| Reactional mixture (HF+C₂H₂) | | Time of tests in hours | Temperature of the reaction | Composition of the condensate (in volume percent) | | |
|---|---|---|---|---|---|---|
| Molar ratio HF/C₂H₂ | Space velocity (v./v./h.)* | | | CH₂=CHF | C₂H₂ | CH₃−CHF₂ |
| 2/2 | 110 | 15 | 67 | 60.2 | 39.5 | 0.3 |
| 2/2 | 110 | 53 | 66 | 61.9 | 37.7 | 0.4 |
| 2/2 | 110 | 74 | 64 | 59.9 | 42.5 | 0.6 |
| 3/2 | 150 | 88 | 62 | 60.8 | 38.5 | 0.7 |

*Volume of gaseous mixture per volume of catalyst and per hour.

The catalyst after 100 hours of discontinuous working still provides a rate of transformation of acetylene of about 60 percent and a yield of vinyl fluoride of 98.5 molar percent.

*Example 2*

A similar catalyst is prepared by impregnating 800 cm.³ of sintered alumina of Example 1 with 250 cm.³ of an aqueous solution containing 75 g. of mercuric nitrate and 10 cm.³ concentrated HNO₃. After drying and treating with hydrogen fluoride according to Example 1 at 50° C. the tubular reactor is provided with a mixture of equimolar proportions of acetylene and hydrogen fluoride introduced in the reactor with a space velocity of 110 (volumes of reactant gas per volume of reaction chamber per hour). The reaction temperature is about 60° C. and the rate of transformation of acetylene into vinyl fluoride is within the range of 55 to 60 molar percent. The amount of difluoroethane 1,1 in the gas after eliminating unreacted HF, does not exceed 0.5 molar percent.

*Example 3*

Under the conditions as in Example 1, a catalyst is prepared with mercuric nitrate laid on porous sintered alumina, by impregnating 800 cm.³ of porous sintered alumina by means of a solution containing 140 g. of mercuric nitrate, in 500 cm.³ of water added with 20 cm.³ of concentrated nitric acid. The catalyst is dried and then treated by hydrogen fluoride under the same conditions as in Example 1.

A gaseous mixture, the volumetric composition of which is C₂H₂, 48%; HF, 50%; nitrogen oxides, 2%, is passed through the catalyst bed at a temperature of 65° C. and with a space velocity of 110 (volumes of reactant gas per volume of reaction chamber per hour). After eliminating unreacted acid, the gases are condensed and the volumetric composition of the condensate is CH₂=CHF:66%, C₂H₂:34%. The addition of traces of nitrogen oxides has thus provided an improvement in the selectivity and the yield of the reaction.

It will be understood that various changes and modifications can be made in the above described subject matter which provide the characteristics of this invention without departing from the spirit thereof particularly as defined in the following claims.

That which is claimed is:

1. In the process of hydrofluorinating acetylenic hydrocarbons in the presence of a catalytic agent consisting of mercuric nitrate and a carrier, and wherein a gaseous mixture of hydrofluoric acid and acetylenic hydrocarbons is contacted with said catalytic agent at a temperature within the range of 25 to 150° C., the improvement wherein said carrier consists essentially of a porous sintered alumina, having a total porosity between 5 and 50 cubic centimeters per 100 grams of alumina and having a specific surface area between 0.01 and 1.0 square meters per gram of alumina and in which the materials are present in the amount of 1–40 percent by weight of the mercuric nitrate and 60–99 percent by weight of the porous sintered alumina.

2. A process in accordance with claim 1 wherein the acetylenic hydrocarbons comprise acetylene and wherein the gaseous mixture is contacted with said catalytic agent at a temperature within the range of 40 to 100° C.

3. A process in accordance with claim 1 in which said catalytic agent contains between 5 and 20 percent by weight of a salt of mercury and between 80 and 95 percent by weight of porous sintered alumina.

4. A process in accordance with claim 1 including the step of passing a gaseous current through said catalytic agent prior to contacting said gaseous mixture with said catalytic agent, said gaseous current comprising anhydrous hydrogen fluoride and a gas which will not react with said hydrogen fluoride or with said catalytic agent.

5. A process in accordance with claim 4 in which said gaseous current is passed through said catalytic agent at a temperature between 20 and 100° C.

References Cited

UNITED STATES PATENTS

| 2,437,148 | 3/1948 | Barney | 260—653.4 |
| 2,471,525 | 5/1949 | Hillyer et al. | 260—653.4 |
| 2,574,480 | 11/1951 | Hillyer et al. | 260—653.4 |
| 2,606,159 | 4/1952 | Owen | 252—455 |
| 3,187,060 | 6/1965 | Petit et al. | 260—653.4 |

LEON ZITVER, *Primary Examiner.*

DANIEL D. HORWITZ, *Examiner.*